United States Patent [19]

Mandel et al.

[11] 3,898,984

[45] Aug. 12, 1975

[54] AMBULATORY PATIENT MONITORING SYSTEM

[75] Inventors: Louis Mandel; Algernon M. Ong; Paul Singer, all of San Diego, Calif.

[73] Assignee: The United States of America as represented by the Secretary of the Navy, Washington, D.C.

[22] Filed: Feb. 4, 1974

[21] Appl. No.: 439,199

[52] U.S. Cl. .......................... 128/2.1 A; 128/2.06 R
[51] Int. Cl.² ........................................... A61B 5/04
[58] Field of Search ..... 128/2.05 R, 2.06 A, 2.06 B, 128/2.06 F, 2.06 G, 2.06 R, 2.1 A

[56] References Cited
UNITED STATES PATENTS

| | | | |
|---|---|---|---|
| 3,253,588 | 5/1966 | Vuillevmier et al. ............ | 128/2.1 A |
| 3,517,662 | 6/1970 | Finch et al. .................... | 128/2.06 B |
| 3,587,563 | 6/1971 | Ragsdale ....................... | 128/2.06 A |
| 3,639,907 | 2/1972 | Greatbatch ..................... | 128/2.1 A |
| 3,646,606 | 2/1972 | Buxton et al. ................... | 128/2.1 A |

*Primary Examiner*—William E. Kamm
*Attorney, Agent, or Firm*—R. S. Sciascia; G. J. Rubens; T. M. Phillips

[57] ABSTRACT

An apparatus for automatically monitoring critical body functions of one or more patients by means of telemetry restricted to the use of a single assigned RF carrier frequency. A logic circuit provides for generating a synchronized coded word for interrogating a transponder. The transponder has sensing means for sensing the critical body functions and in response to the interrogation transmits an information signal plus a triggering signal to cause sequential generation of coded words so that each of the transponders may be sequentially interrogated. Provision is also made for selectively interrogating a particular transponder if the need arises.

3 Claims, 2 Drawing Figures

3,898,984

AMBULATORY PATIENT MONITORING SYSTEM

BACKGROUND OF THE INVENTION

The present invention relates to apparatus for the automatic monitoring of critical body functions of one or more ambulatory patients and more particularly to apparatus for the automatic monitoring of critical body functions of one or more ambulatory patients utilizing novel telemetry techniques. Presently known systems of this type utilize telemetry to transmit critical body function information to a central processing station however none of the known systems provide for a simple means of sequentially monitoring ambulatory patients.

SUMMARY OF THE INVENTION

The present invention provides an ambulatory patient monitoring system consisting of analog and digital circuitry wherein a transponder device with sensors is positioned on the patient and is equipped to receive interrogating signals from a monitoring station and in response to the interrogating signals transmit the required information to give the condition of the particular function that is sensed by the sensing equipment. The transponder also transmits a signal for causing the monitoring equipment to transmit a different coded signal which will cause interrogation of the next patient in rotation. The patient interrogating and monitoring station which transmits the control signals also receives information back from the patient and provides a display and pulse readout. The received information may be monitored visually or by audio equipment.

OBJECTS OF THE INVENTION

An object of the invention is the provision of an automatic monitoring system for monitoring critical body functions of one of more patients by means of a radio link restricted to the use of a single carrier frequency.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
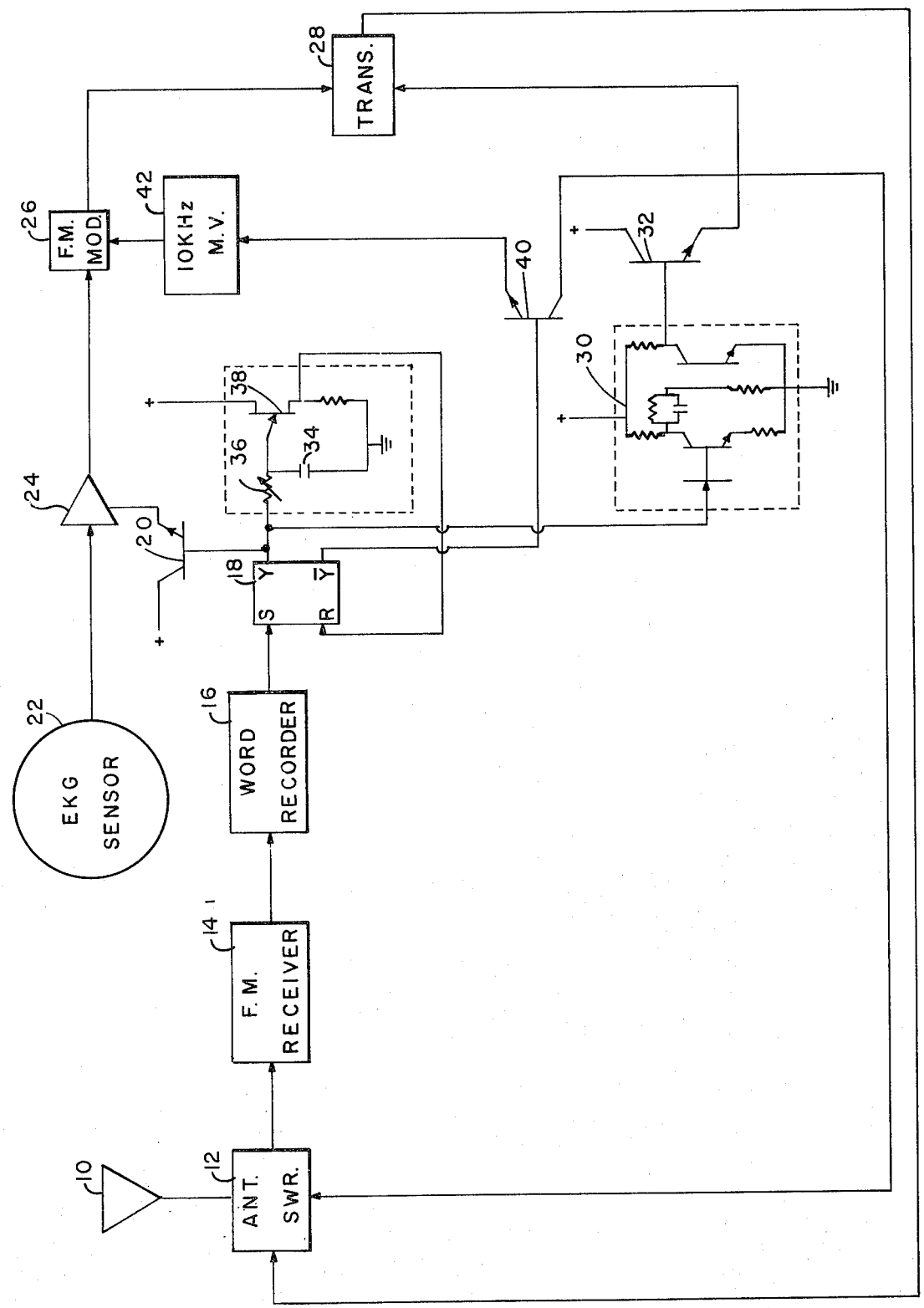
FIG. 1 is a block diagram of the patient transponder.

Referring now to FIG. 1 there is shown a patient transponder which would be co-located with an ambulatory patient.

An antenna 10 for receiving and transmitting signals is coupled to antenna switch 12 which is normally in the de-energized or receiving mode and couples antenna 10 to the FM receiver 14. FM receiver 14 receives and demodulates the incoming digitally coded message and if the appropriate coded word is received will activate word decoder 16. The pulse generated by word decoder 16 toggles set-reset flip-flop 18 causing the output Y to switch to a high voltage state. The high voltage level at Y is connected to the base of transistor switch 20 and will cause transistor 20 to switch on. This provides operating current to amplifier 24 which in this case is used as a buffer and amplifies the sensed signal obtained from EKG sensor 22. The resultant amplified voltage is applied to FM modulator 26 whose output is fed to modulate transmitter 28.

The output voltage from terminal Y of set-reset flip-flop 18 is also used to toggle monostable multivibrator 30 causing its output to go high. Monostable multivibrator 30 is prevented from resetting by the clamping action of the voltage from terminal Y of the set-reset flip-flop 18. The output of multivibrator 30 is fed to the base of transistor switch 32 causing it to turn on thereby providing operating power to transmitter 28 and antenna switch 12. Energizing antenna switch 12 changes the coupling of antenna 10 from the FM receiver 14 to the output of transmitter 28. Therefore a signal will be transmitted from antenna 10 so long as transistor 32 is in the conducting mode.

The output voltage from terminal Y of set-reset flip-flop 18 also charges capacitor 34 through resistor 36. The values of capacitor 34 and resistor 36 would be selected to delay the firing of unijunction transistor 38 by approximately 5 seconds. During this delay the EKG information is being transmitted. At the end of 5 seconds the output of unijunction 38 provides a trigger voltage which is coupled to the reset terminal of set-reset flip-flop 18. When this occurs the Y output of set-reset multivibrator 18 goes low and the terminal $\overline{Y}$ output goes high. The output voltage from terminal $\overline{Y}$ turns on transistor switch 40 which is in series with switch 32 and provides operating current for energizing the 10 KHz bistable multivibrator 42. The output voltage from multivibrator 42 is fed to FM modulator 26 and is subsequently transmitted through transmitter 28 and antenna 10.

When the voltage at terminal Y of set-reset flip-flop 18 goes low transistor switch 20 turns off disabling amplifier 24 and also removes the clamping voltage from the input of multivibrator 30. Removal of the clamp voltage permits the multivibrator 30 to reset following a time delay of 100 milliseconds. During this 100 millisecond period the 10KHz astable multivibrator 42 will operate. At the end of the 100 milliseconds transistor switch 32 will turn off with subsequent removal of operating power to transmitter 29 and antenna switch 12 resulting in recoupling of antenna 10 to FM receiver 14. The cycle is repeated by the reception of the next coded word by way of antenna 10.

Figure 2:
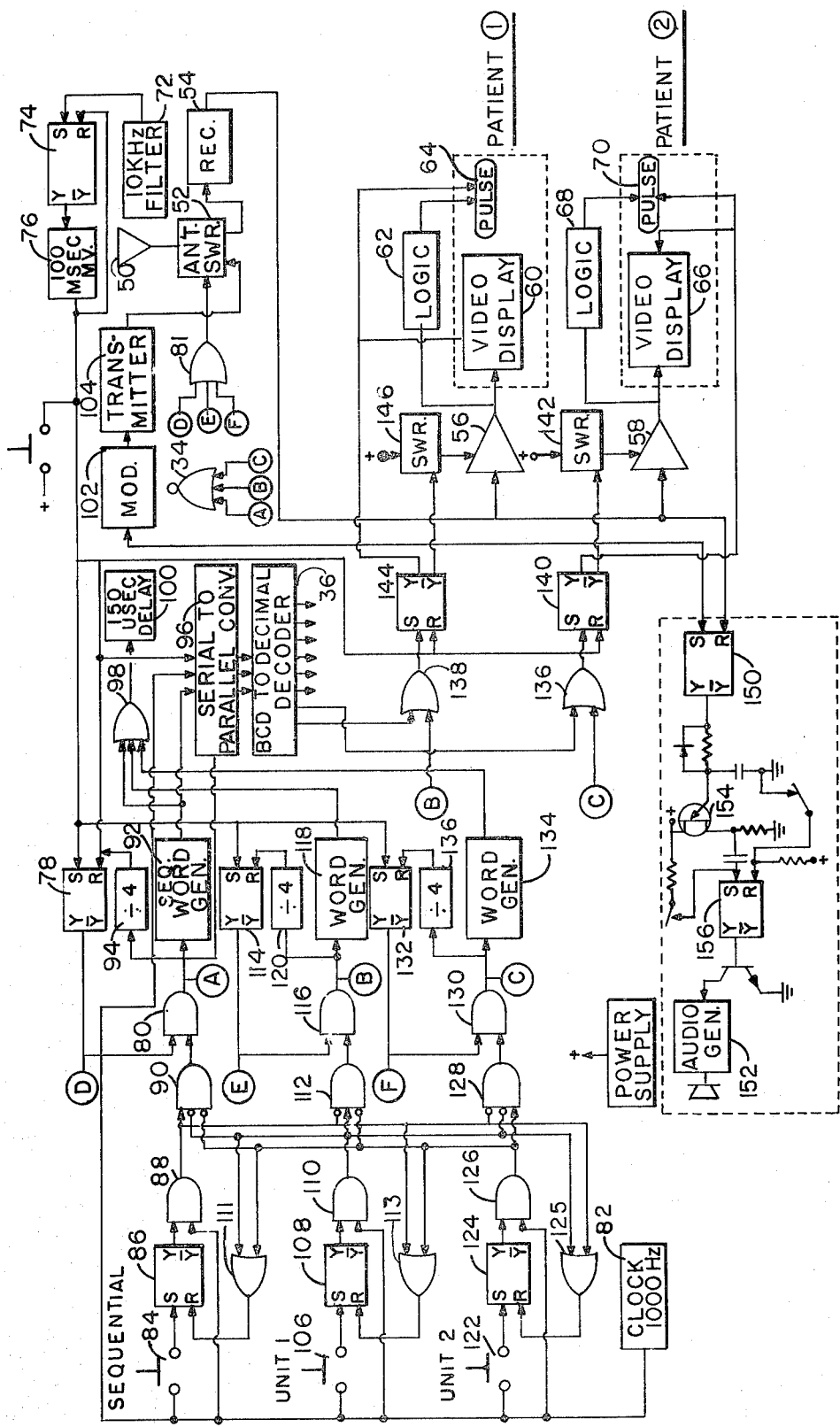
FIG. 2 is a block diagram of the patient monitor and interrogating station.

Referring now to FIG. 2 wherein there is shown the interrogation and monitoring apparatus. There are two modes of operation which are determined by the closing of either of switches 84, 106 or 122: If switch 106 or 122 is depressed, the resultant mode of operation will be that of repeated interrogation of the transponder associated with that particular switch. If switch 84 is depressed, the mode of operation will now provide repeated sequential monitoring of all patient transponders.

Depressing switch 84 provides a path from the 1000Hz clock 82 to the set terminal of the set-reset flip-flop 86 causing output Y of this flip-flop to switch to the high state. This output is directly connected to one input of the two-input AND gate 88. The other input of this gate is directly connected to the 1000Hz clock 82. This provides continuous clock pulses at the output of two-input gate 88 and inhibits units 1 and 2. These clock pulses are connected to the non-inverting terminal of three-input AND gate 90.

When operating in the sequential monitoring mode, signals received from the transponder of FIG. 1 are received at antenna 50 and fed through antenna switch 52 to a radio receiver 54. The received signal consists of a 5 second burst of sensor information followed by a 100 millisecond duration of 10Hz. The output from receiver 54 is coupled to the inputs of amplifier 56 and 58. The signal will be routed by either one of the amplifiers determined by the control applied to the selected amplifier in a manner to be described hereinafter. Assuming amplifier 56 is gated on, the signal will be presented by video display 60 and in addition logic circuit 62 is used to operate the indicator 64 providing a pulse rate reading of patient No. 1. In a similar manner the selection of amplifier 58 would provide the required signal to operate video display 66, logic circuit 68 and pulse indicator 70.

The 10KHz portion of the received signal is fed from receiver 54 through a 10 Kz filter 72 to set-reset flip-flop 74 which provides a pulse to trigger the 100 millisecond delay multivibrator 76. The output pulse from multivibrator 76 switches set-reset flip-flops 78, 114 and 132 such that their Y outputs are high. The output of multivibrator 76 is also used to reset set-reset flip-flop 74. The high output signal from flip-flop 78 provides an enabling signal to gate 80 and also to NOR gate 81. With the enabling signal present at gate 80, clock pulses will be fed to the input of seauence word generator 92, divide-by-four circuit 94, serial to parallel converter 96 and to NOR gate 34. The output of divide-by-four circuit 94 is coupled to the reset terminal of set-reset flip-flop 78 thereby resetting flip-flop 78 on the leading edge of the fourth clock pulse. This will limit the number of sequential clock pulses to word generator 92 to three. The coded serial output from sequence word generator 92 is converted to parallel logic by means of serial to parallel converter 96. The resultant logic output is further converted to decimal logic by means of BCD to decimal decoder 36. The active output from decoder 36 selects which patient display will accept data input for display. NOR gates 138 and 136 and flip-flops 144 and 140 will be activated in sequence.

The output of sequence word generator 92 is also fed through three input OR gate 98 to a 150 microsecond delay circuit 100 which feeds the delayed signal to modulator 102. Also the output clock pulses from gate 80 is fed through three input NOR gate 34 is fed to modulator 102. The clock pulses are necessary for synchronization at the decoding by the transponder. Separation between the clock pulses and the coded word is accomplished by means of the 150 microsecond delay 200. The modulated signal is fed to transmitter 104 and antenna switch 52 for transmission by antenna 50. Antenna switch 52 is switched to the transmitting position by means of output signals from set-reset flip-flops 78, 114, and 132. When the output from divide-by-four circuit 54 resets set-reset flip-flop 78, terminal D goes low and allows antenna switch 52 to return to the receiving mode of operation.

The above sequence will continue unless either of unit 1 or unit 2 is activated. This would only be done if it is desired to maintain repeated surveillance of a particular patient. In this case, for example, switch 106 of unit 1 would be closed thereby pre-setting set-reset flip-flop 108 to provide a signal to gate 110 which will permit clock pulses from clock pulse 82 to pass to AND gate 112. The output from gate 110 is also fed through OR gate 111 to unlatch set-reset flip-flop 86 thereby disabling the previously selected sequential mode of operation. Since the same 100 millisecond signal from multivibrator 76 is received at set-reset flip-flop 114 an enabling signal will appear at AND gate 116 to permit the clock pulses to pass to word generator 118, divide-by-four circuit 120 and OR circuit 34. The output from word generator 118 would be fed to OR circuit 98 and to transmitter 104 and transmitted in the same manner as described above. In a similar manner unit 2 can be enabled by closing switch 122 to pre-set set-reset flip-flop 124 to provide a signal to enable AND gate 126 permitting clock pulses to pass to AND gate 128 and AND gate 130. A disabling pulse will be fed through OR gate 113 to unlatch flip-flop 108. AND gate 130 is enabled by the signal from set-reset flip-flop 132 in a similar manner as described above. The output from AND gate 130 is fed to word generator 134, divide-by-four circuit 136 and OR gate 34. The output signal from word generator 134 would be transmitted in the same manner as described above. A failure alarm is provided so that if no signal is received to reset set-reset flip-flop 150 which has been preset during the transmission of a signal. In the event that there is no response from the transponder for a period of 2 seconds unijunction transistor 154 will generate a bigger pulse to cause flip-flop 156 to latch high and provide a signal to turn on the audio generator 152.

The video display and pulse readout may comprise a storage oscilloscope and digital panel meter in sets to display the information obtained from each patient unit. The oscilloscope would be adjusted for a horizontal sweep length of 5 seconds and the trigger circuit preset so the sweep will be triggered by the positive leading edge of the electrocardiogram waveform. The elapsed time between consecutive peaks of the electrocardiogram pulse is interpolated and used to provide indication of the patient pulse rate presented on the digital panel meter.

Obviously many modifications and variations of the present invention are possible in the light of the above teachings. It is therefore to be understood that within the scope of the appended claims the invention may be practiced otherwise than as specifically described.

What is claimed is:

1. A system for automatically monitoring critical body functions of one or more ambulatory patients, the combination of:

a. an interrogating and monitoring station operating on a fixed frequency having means for generating and transmitting a plurality of digital coded interrogating signals and having means for receiving and displaying critical body function information received in response to said transmitted signal, b. at least one patient transponder operating at said fixed frequency and having sensing means coupled to the patient for sensing at least one critical body function and being responsive to at least one of said digital coded interrogation signals for transmitting a signal containing said sensed critical body function, said patient transponder including;

c. a set reset flip-flop circuit having high and low voltage output terminals, set and reset input terminals, d. a delay circuit coupled between said high voltage output terminal and said reset input terminal for providing a reset signal to said reset input after a predetermined time delay, e. means coupled to said set input terminal for causing a high output from said high voltage output terminal, f. means coupled to said sensing means and to said high voltage output terminal for causing the vital body information to be transmitted for the duration of the high output from said high voltage output terminal, g. means coupled to said low voltage output terminal and being responsive to a high output from said low voltage output terminal when said reset signal causes the high output to go low and the low output to go high for generating a trigger signal that will initiate the next sequentially coded signal by said interrogating and monitoring station to be transmitted.

2. The system of claim 1 wherein said interrogating and monitoring station includes digital means for sequentially interrogating of all the patient transponders.

3. The system of claim 1 wherein said means coupled to said low voltage output terminal includes: a multivibrator, first and second transistors connected in series with said multivibrator, means coupled to said first transistor and to said set-reset flip-flop circuit for biasing said first transistor in a conducting condition for the duration of the transmission of said vital body information and for a short predetermined time thereafter, said second transistor being coupled to the normally low voltage output terminal of said flip-flop and being responsive to the output of said flip-flop when its normally low voltage output goes high to turn on causing said multivibrator to be turned on until said second transistor becomes non-conducting.

\* \* \* \* \*